United States Patent [19]

Chandos et al.

[11] Patent Number: 5,615,214
[45] Date of Patent: Mar. 25, 1997

[54] SYSTEM AND METHOD OF COMPENSATING PROPAGATION TIME VARIATIONS AND SUBSTITUTING FOR LOST PACKETS IN A PACKETIZED VOICE COMMUNICATION SYSTEM

[75] Inventors: Ronald V. Chandos, Tempe; Brent M. McKay, Chandler, both of Ariz.

[73] Assignee: Motorola, Inc., Schaumburg, Ill.

[21] Appl. No.: 550,318

[22] Filed: Oct. 30, 1995

[51] Int. Cl.⁶ .................................................. H04J 3/14
[52] U.S. Cl. ................................... 370/349; 370/474
[58] Field of Search .................. 370/94.1, 94.2, 370/61, 79, 80, 81, 82, 83, 13, 17

[56] References Cited

U.S. PATENT DOCUMENTS

4,864,561  9/1989  Ashenfelter et al. ............ 370/81
5,353,062 10/1994  Maeda .............................. 348/412

Primary Examiner—Wellington Chin
Assistant Examiner—Huy D. Vu
Attorney, Agent, or Firm—Kevin K. Johanson

[57] ABSTRACT

In a packetized communication system, packets are dispatched to a receiving node (10) for reassembly and presentation to a user. Packets propagating over dynamic paths have propagation variations between subsequent packets. Interactive packetized voice communication systems mandate that end-to-end delays be minimized. This results in voice gaps between an on-time synthesized voice data (602''') and a subsequent delayed synthesized voice data (603'''). Voice gaps are temporarily patched with voice prediction samples and end-to-end timing is adjusted to minimized prediction samples. When packets are lost in the network, prediction packets are substituted and annunciated to a user until valid packets are received.

18 Claims, 8 Drawing Sheets

FIG. 9

SYSTEM AND METHOD OF COMPENSATING PROPAGATION TIME VARIATIONS AND SUBSTITUTING FOR LOST PACKETS IN A PACKETIZED VOICE COMMUNICATION SYSTEM

TECHNICAL FIELD

This invention relates generally to packetized communication systems and, in particular, to systems and methods of compensating for variations in propagation delays between nodes relaying packetized voice data.

BACKGROUND OF THE INVENTION

In communication systems, particularly in systems where transmitting or receiving nodes are substantially mobile, or in systems where propagation paths may vary, packetized data dispatched from a transmitting node may arrive at a receiving node during a broad anticipated timing window. In strictly non-interactive data applications, such as a datagram service or bulk data mail system, such variations in arrival time suffice as delivery may simply be postponed while all data packets are regrouped.

In traditional interactive packetized communication systems, such as terrestrial systems, users are unaware of postponed delivery of staggered packets since such delays are on the order of milliseconds or tens of milliseconds. However, in packetized systems where propagation delays are substantially larger, such as in a satellite network, anticipated timing windows may be much broader and postponement of delivery may result in delays on the order of tens or hundreds of milliseconds. For non-interactive systems, such a delay again is generally tolerable.

However, in an interactive packetized voice communication system, delays of tens or hundreds of milliseconds in addition to inherent propagation times are very undesirable. For interactive voice systems, delays of several hundred milliseconds becomes annoying to users and commercially less practical.

Additionally, in dynamic communication systems where propagation paths are not static, such as in orbiting satellite communication systems, propagation path delays vary as relay nodes evolve. Orbiting satellites, for example, introduce propagation delay variations between transmission of individual packets. Such variations introduce what appears to a receiving node to be packet "jitter." A receiving node must then process these packets by aligning them up end to end and minimize gaps between packets. Traditional terrestrial or non-interactive systems have simply estimated a maximum propagation delay and postponed delivery or annunciation of packetized data until well past the maximum delay.

Additionally, in complex multi-relay packetized systems, packets may be lost or dropped. A receiving node in an interactive system must substitute or predict appropriate values to compensate for such losses. In a packetized voice communication system, if packetized data represents a small portion of voice data, then a receiving node may sufficiently approximate or predict relatively small portions of voice data.

Accordingly, there is a significant need for a method and system for compensating for propagation time variations in a packetized voice communication system while providing for minimum delay in the presentation of voice data to a user.

Also, there is a significant need for a method and system for substituting for lost packets in a packetized voice communication system while presenting any lost or late packets to a user with minimum delay.

DESCRIPTION OF THE PREFERRED EMBODIMENTS

Figure 1:
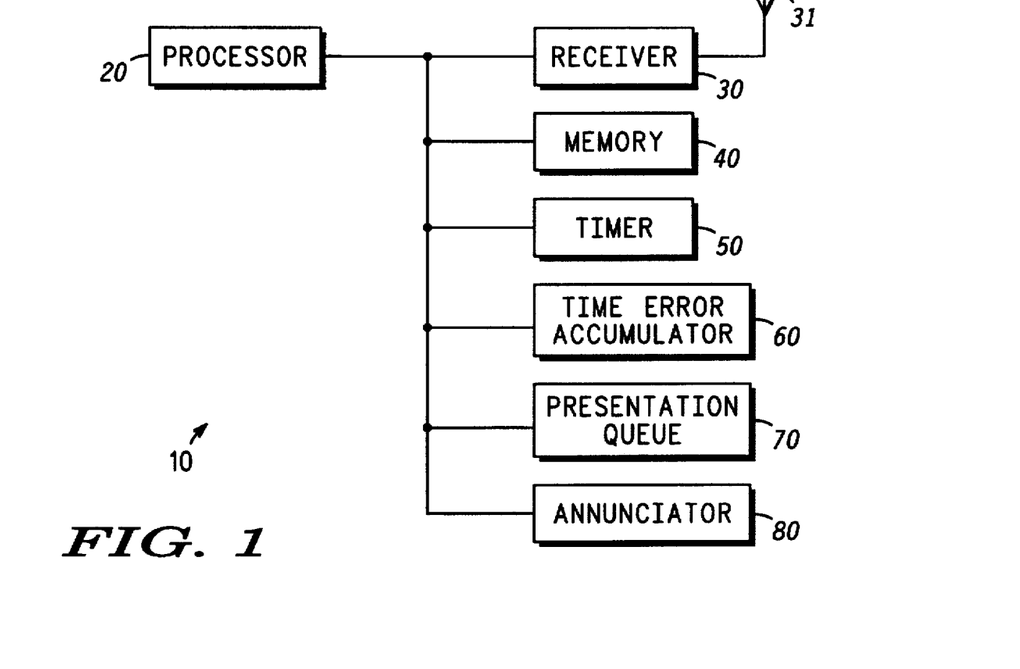
FIG. 1 is a simplified block diagram of a receiving node in a packetized voice communication system of which the present invention may form a portion thereof.

FIG. 1 is a simplified block diagram of a receiving node in a packetized voice communication system of which the present invention may form a portion thereof. A receiving node 10 receives digitized data packets generally containing voice data. Packetized voice data originated at yet another node called a transmitting node. A transmitting node packetized the voice data and transmitted it into a communication network. Such a communication network routes the packetized voice data to receiving node 10. The packetized voice data may also have passed through intermediary nodes, such as relays, and acquired yet additional propagation delays associated with transmission to and from a relay station. Relay stations may take the form of satellites, both geostationary and orbiting, that interject their own propagation variations that may impact anticipated periodic reception by receiving node 10. In orbiting satellites, propagation variations are inherent in the varying transmission distances with a receiving node.

In the preferred embodiment, a transmitting node may be a portable subscriber unit interfacing and transmitting packetized voice data to an orbiting satellite. For situations where there is no speech activity at the transmitter, the transmitter will send a special packet called a silence identifier (SID), indicating that no more packets will be sent until speech again commences. The orbiting satellite then relays the packetized voice data with its inherent propagation variations to receiving node 10. Receiving node 10 must reassemble the packetized voice data into comprehensible voice data for direct presentation to a user or for indirect delivery to standard analog PSTN for traditional delivery to a distant user.

Receiving node 10 comprises a receiver 30 for reception of packetized voice data via antenna 31. A processor 20 couples to receiver 30 for controlling and receiving packetized voice data. Receiver 30 may also be comprised of a vocoder or transcoder for synthesizing speech from packetized compressed voice data. Processor 20 is desirably a programmable device, such as a microprocessor or the like, which performs operations defined by software instructions stored in a memory 40. A timer 50 couples to controller 20 for measuring an arrival time of a voice packet. A time error accumulator couples to processor 20 for maintaining a difference between arrival times and a variation associated with an expected or anticipated arrival time of one or more voice packets. A presentation queue or FIFO 70 couples to processor 20 for receiving annunciation packets such as voice packets, voice pause packets created by processor 20 in response to a received voice pause indicator, or prediction data for filling gaps in voice data due to delayed or lost voice packets. An annunciator or speaker 80 couples to processor 20 directly on a microprocessor bus or annunciator 80 may directly couple to presentation queue 70 for presenting the annunciation packets stored in presentation queue 70. Annunciator 80 may be a direct audio connection generating user perceivable sounds, or may be electrically coupled so as to interface with a standard telephony system such as PSTN or GSM.

Figure 2:
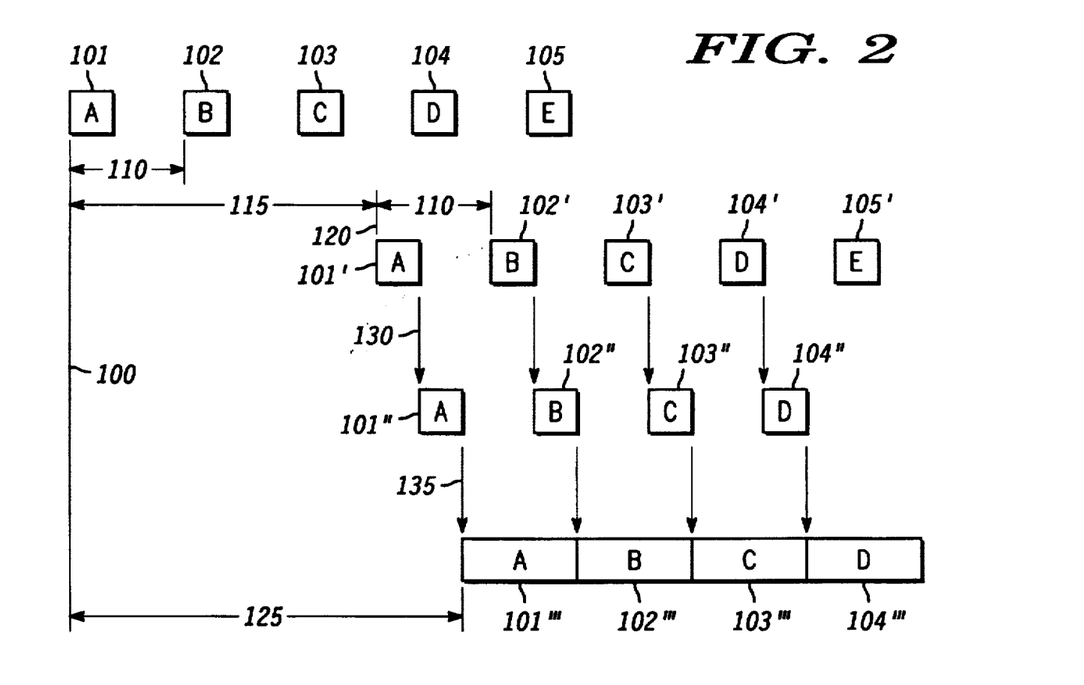
FIG. 2 is a simplified timing diagram of packetized data transmitted through an ideal network having consistent delay.

FIG. 2 is a simplified timing diagram of packetized data transmitted through an ideal network having consistent delay. A transmitting node dispatches a plurality of digitized voice packets 101–105 into a communication network at a periodic packet dispatch period 110 as referenced to a packet dispatch reference time 100. Digitized voice packets 101–105, in an ideal consistent delay network, propagate throughout the network with a network delay 115 and arrive at receiving node 10 as digitized voice packets 101'–105' at a packet arrival time 120. Digitized voice packets 101'–105' are passed through a speech synthesis processing function performed on digitized voice packets 101"–105", adding additional delay between begin speech synthesis reference time 130 to end speech synthesis reference time 135. Upon completion of speech synthesis processing function on digitized voice packets 101"–105", compressed voice packets 101'–105' have been transformed into uncompressed voice samples 101'''–105''', in a form which can be presented to a human listener. An end-to-end speech delay 125 denotes the minimum delay through the network for all processing in an ideal network.

Figure 3:
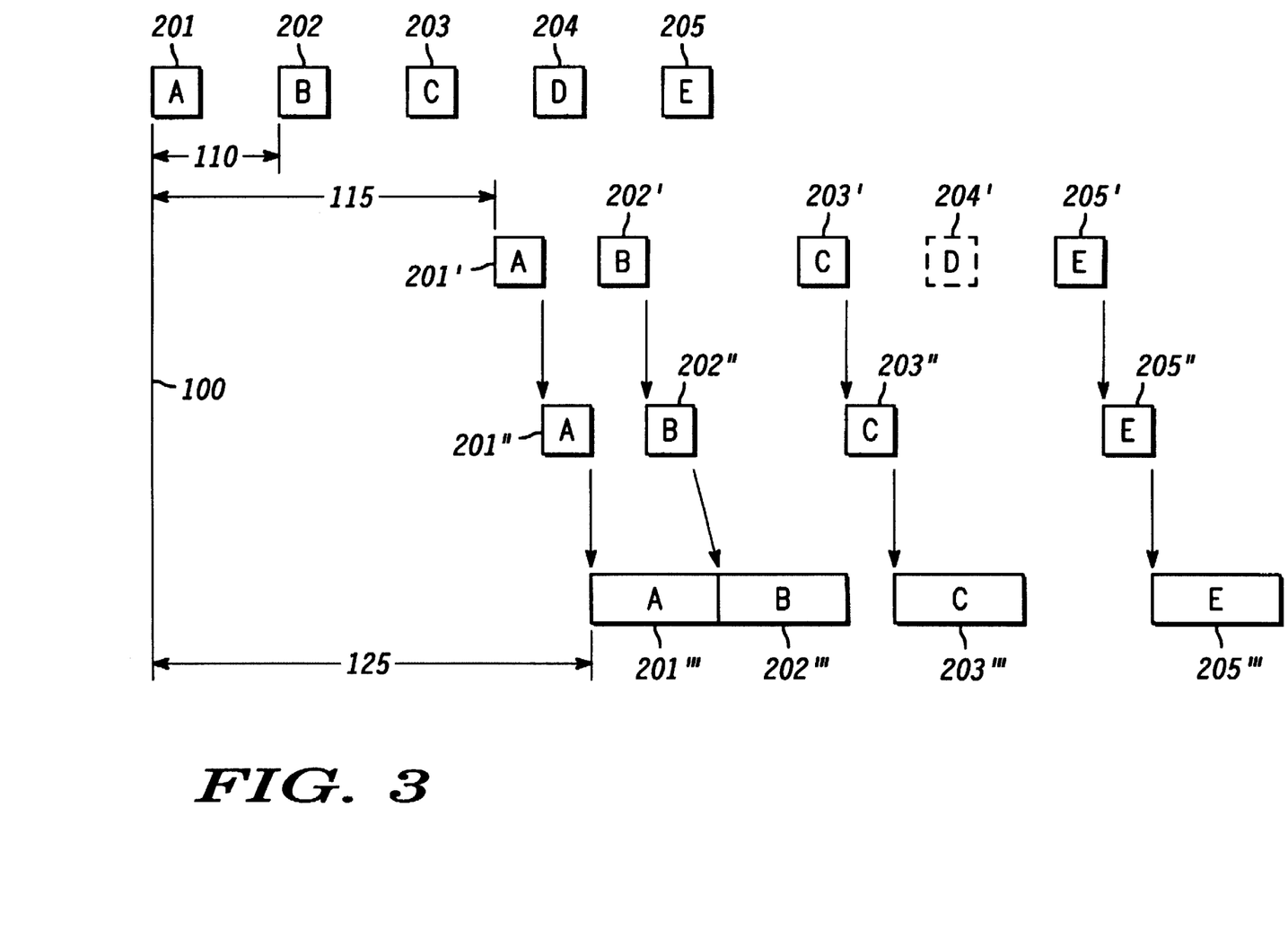
FIG. 3 is a simplified timing diagram of packetized data transmitted through a dynamic network having variable delay and intermittent packet loss.

FIG. 3 is a simplified timing diagram of packetized data transmitted through a dynamic network having variable delay and intermittent packet loss. Although ideal networks having consistent propagation characteristics are desirable, practical networks realize delay, distortion, and even lost or contaminated packets. A transmitting node dispatches a plurality of digitized voice packets 201–205 into a communication network at a periodic packet dispatch period 110 as referenced to a packet dispatch reference time 100. This is consistent with FIG. 2 and an ideal network. However, digitized voice packets 201–205, in a dynamic network, propagate with differences in delay. Digitized voice packet 201' propagates with a network delay 115, however, digitized voice packet 202' propagates more quickly through the network and arrives early at receiving node 10.

On the other hand, networks frequently realized varying or unexpected delays of subsequent packets. Digitized voice packet 203' propagates through a network path having a greater than periodically anticipated delay and arrives at node 10 later than expected. This delay causes a gap following synthesized voice data 201''' and 202''' and between synthesized voice data 202''' and 203''' Such gaps due to delayed packets have traditionally been compensated for by extending the end-to-end speech delay 125. However, in interactive systems, such extensions are intolerable and annoying to the user.

Additionally, a network frequently loses or corrupts a packet as depicted by digitized voice packet 204'. When such a packet is lost or unusable, a gap appears in the synthesized voice data as is shown between synthesized voice data 203''' and 205'''. Gaps due to lost packets are not easily filled by extending or delaying the presentation of synthesized voice data, but are better compensated for by predicting substitutable values and inserting them in gaps as described in FIG. 5.

Figure 4:
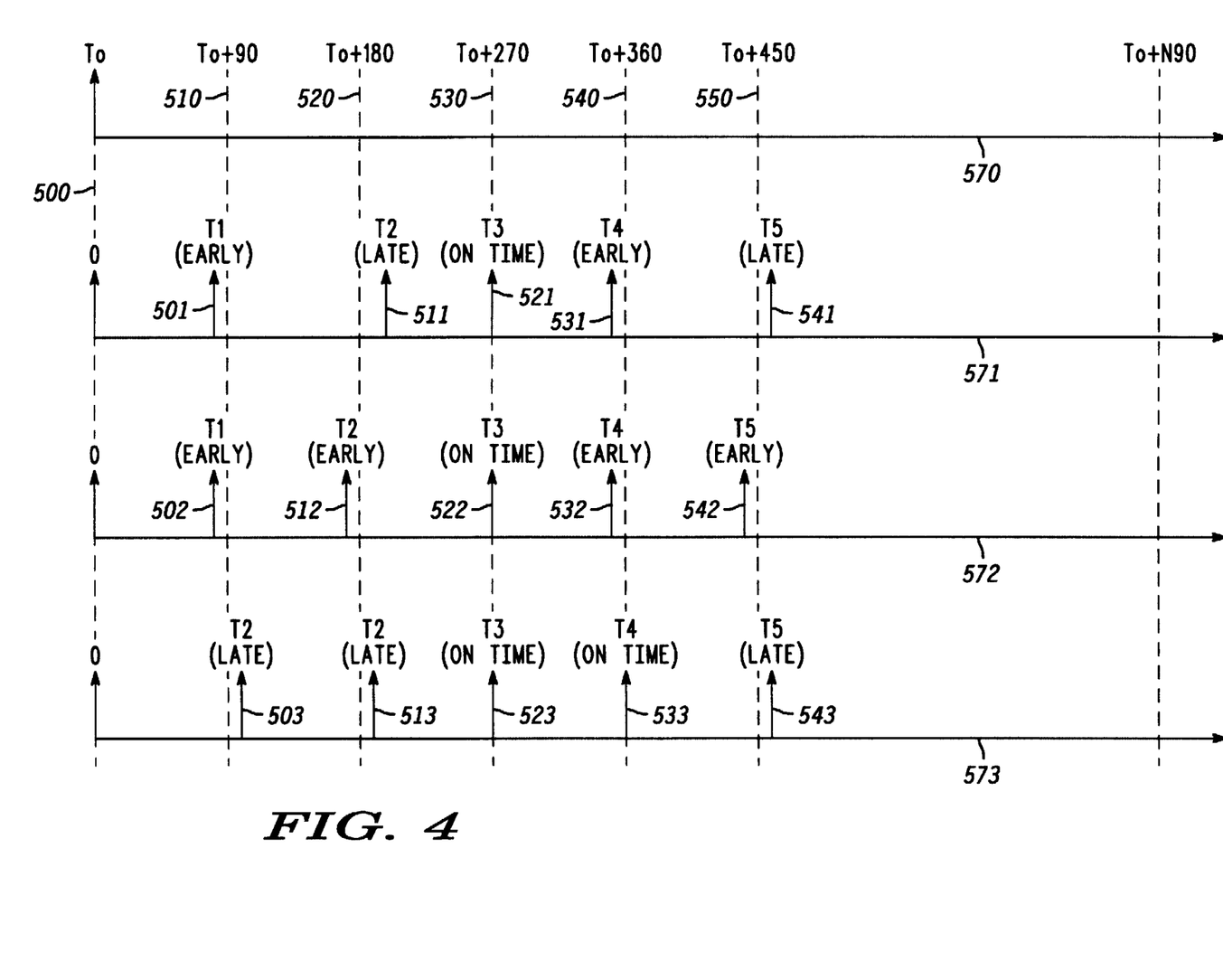
FIG. 4 is an error accumulation timing diagram arrival times of successive packets as referenced to a reference packet arrival time.

FIG. 4 is an error accumulation timing diagram of arrival times of successive packets as referenced to a reference packet arrival time. In the preferred embodiment, the periodic packet dispatch period 110 (FIG. 1) is shown as 90 msec, and a receive node selects a digitized voice packet as a reference packet and utilizes a reference packet arrival time 500 of the reference packet for determining when subsequent packets should be anticipated and compensated for if lost. In the preferred embodiment, this reference packet is the first one received after a silent period caused by a speech pause. Because the receiving node operates asynchronous to the transmitting node, the receiving node has no method of determining if the reference packet arrival time is actually typical or if it is itself an early or late packet. To compensate for the potential unrepresentative timing of reference packet arrival time 500, receiving node 10 (FIG. 1) maintains a time error accumulator 60 (FIG. 1). This accumulator tracks timing errors of subsequent packets and retains a running variation of these subsequent packets. When receiving node 10 receives a digitized voice packet containing normal voice following generation of either a voice pause packet for annunciation or a prediction packet for annunciation, receiving node adjusts the positioning of the normal voice data within the voice presentation queue. The direction and magnitude of this adjustment results in moving subsequent frames earlier or later in time.

If the time error accumulator value is close to zero, it can be concluded that the reference packet arrived at the average network delay time. If the number is negative, the reference packet arrived with greater than average network delay. If the number is positive, the reference packet arrived with less than average network delay. The time error accumulator is reset for evaluation of the subsequent talk burst following timing compensation.

Receive node reference time lines 570 depicts an ideal time line where each subsequent packet arrives delayed by an expected packet period 510, 520, 530, 540, and 550. Receive node reference time line 571 represents a reference packet arrival time 500 that was representative of the network propagation timing as evidenced by early subsequent packets arrival times 501 and 531 counteracting late subsequent packet arrival times 511 and 541. For reference time lines 570 and 571, the time error accumulator 60 is approximately zero.

Receive node reference time line 572 represents a reference packet arrival time 500 that was later than the average network propagation timing as evidenced by early subsequent packet arrival times 502, 512, 532, and 542 dominating a single on time subsequent packet arrival time 522. This results in a negative time error accumulator value.

Receive node reference time line 573 represents a reference packet arrival time 500 that was earlier than the average network propagation timing as evidenced by late subsequent packet arrival time 503, 513, 533, and 543 dominating a single on time subsequent packet arrival time 523. This results in a positive time error accumulator value.

Figure 5:
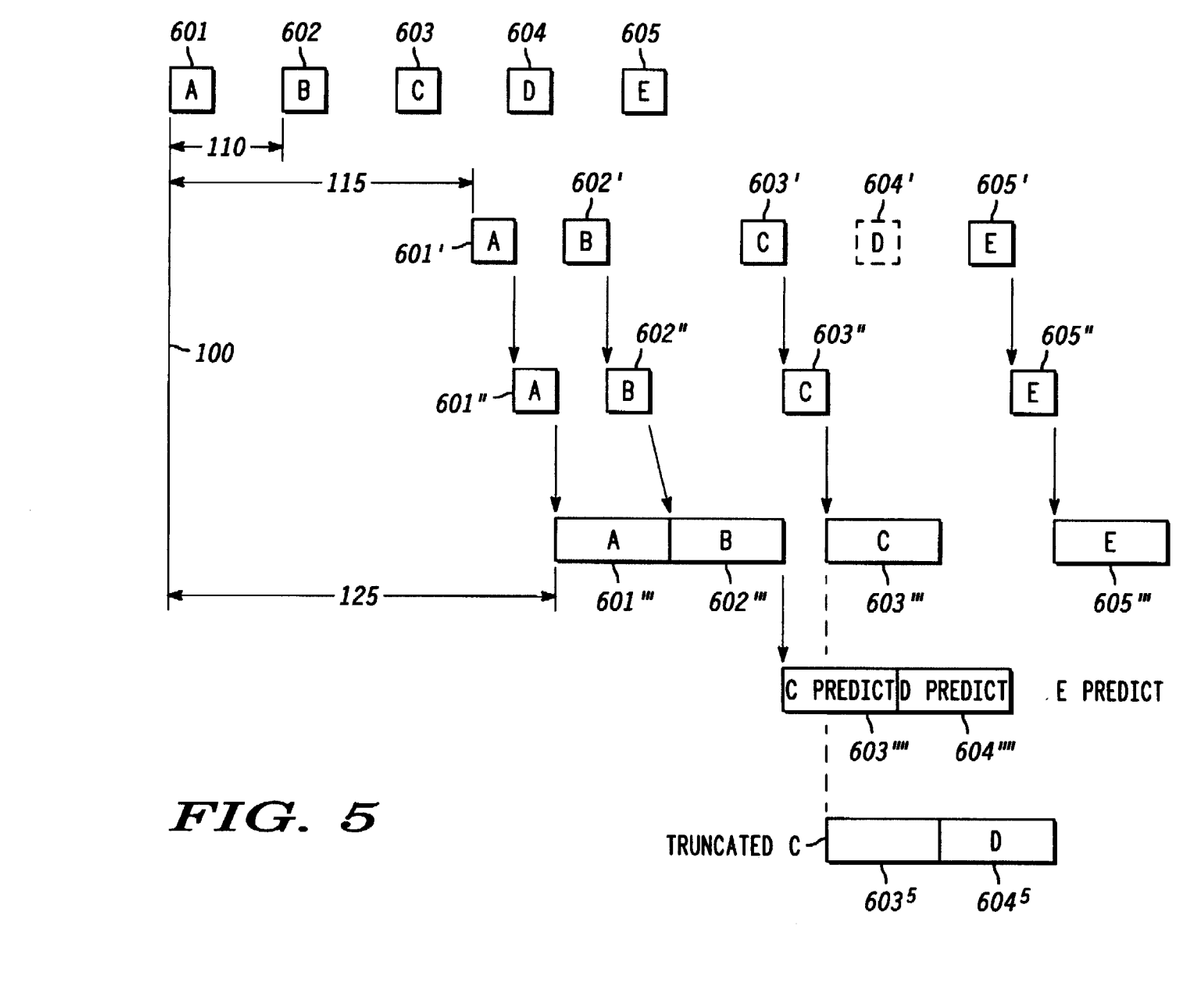
FIG. 5 is a simplified timing diagram of packetized data transmitted through a dynamic network as compensated for by an embodiment of the present invention.

FIG. 5 is a simplified timing diagram of packetized data transmitted through a dynamic network as compensated for by an embodiment of the present invention. As described initially in FIG. 2, a transmitting node dispatches a plurality of digitized voice packets 601–605 into a communication network at a periodic packet dispatch period 110 as referenced to a packet dispatch reference time 100. However, as described in FIG. 3, digitized voice packets 601–605, in a dynamic network, propagate with differences in delay. Digitized voice packet 601' propagates with a network delay 115, however, digitized voice packet 602' propagates more quickly through the network and arrives early at receiving node 10 but is stored in the presentation queue 30 (FIG. 1) for annunciation as synthesized voice data 602''' following synthesized voice data 601'''.

On the other hand, digitized voice packet 603 is excessively delayed in the network and arrives as digitized voice packet 603' for processing as digitized voice packet 603'' into synthesized voice data 603'''. However, because of the undesirability of extending end to end speech delay 125 to compensate for a maximum propagation delay, synthesized voice data 601''' and 602''' are not postponed which results in a gap in the annunciation voice data. In the present invention, when a voice gap appears due to a late or missing packet, a prediction packet 603'''' is generated based on a previous synthesized voice packet, such as synthesized voice data 602'''. When digitized voice packet 603' actually arrives at receiving node 10, it is processed into synthesized voice data 603''' and spliced into the presentation queue in place of the pending portion of prediction packet 603'''' to form truncated synthesized voice data 603'''''.

When a network drops or losses a digitized voice packet 604', a gap would normally appear in the synthesized voice data as noted between synthesized voice data 603''' and 605'''. In the present invention, when a voice gap appears due to a late or missing packet, a prediction packet 604'''' is generated based on a previous synthesized voice packet, such as synthesized voice data 603'''. Prediction packet 604'''' is concatenated as predicted synthesized voice packet 604'''' in the presentation queue to truncated synthesized voice data 603'''''.

FIGS. 6–9 shows a flowchart for compensating propagation time variations and substituting for lost or delayed packets in a packetized voice communication system, in accordance with an embodiment of the present invention.

Figure 6:
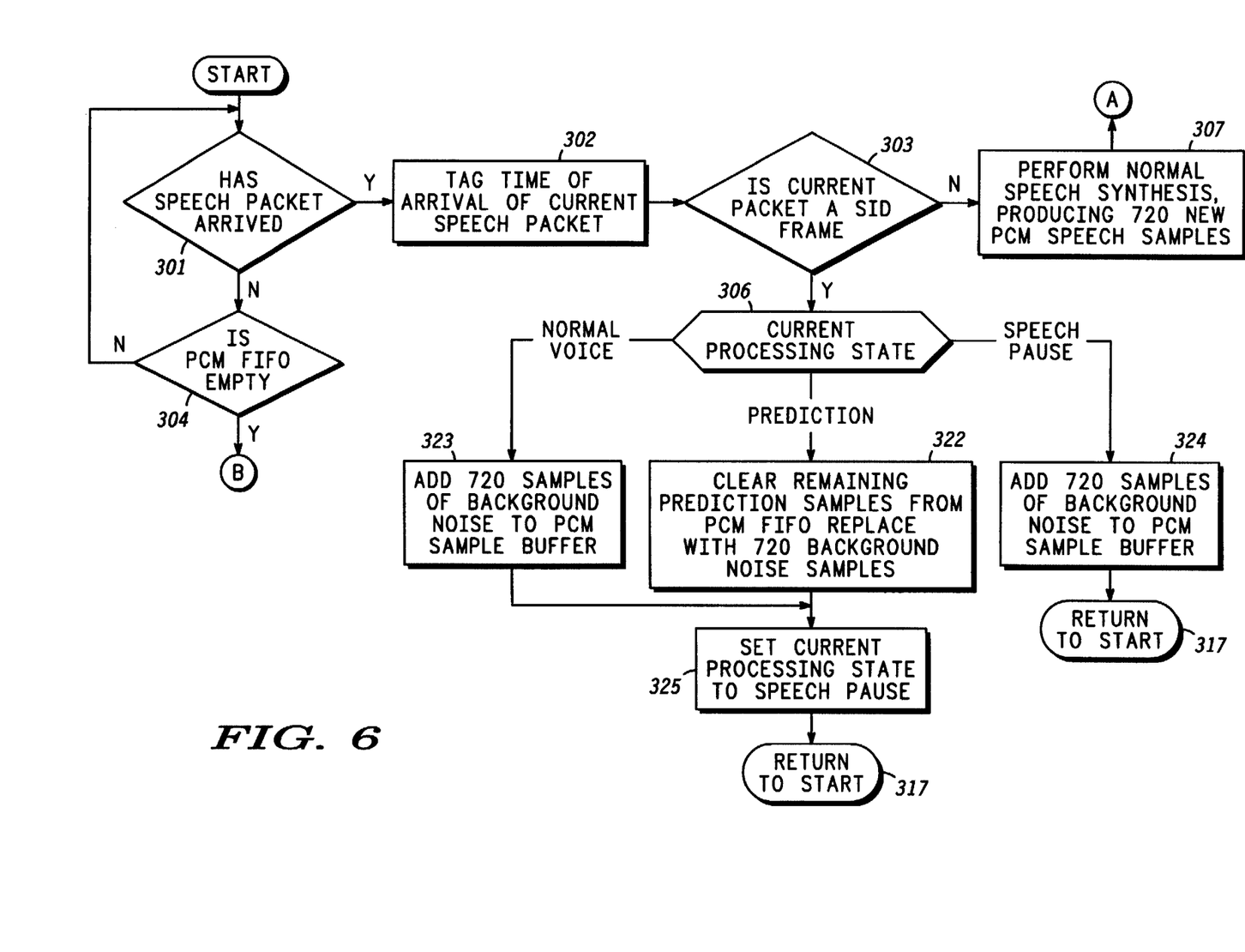
FIGS. 6–9 shows a flowchart for compensating propagation time variations and substituting for lost or delayed packets in a packetized voice communication system, in accordance with an embodiment of the present invention.

In FIG. 6, processing begins wherein a query task 301 determines if a digitized voice packet has arrived. In the preferred embodiment, the periodic packet dispatch period 110 (FIG. 1) is shown as 90 msec. The reconstructed speech sample rate is shown as 8000 speech samples per second. If a digitized voice packet has not arrived, the processing passes to a query task 304 wherein a determination is made as to whether the presentation queue or FIFO 70 (FIG. 1) containing, in the preferred embodiment, pulse code modulation samples representing synthesized voice data. If presentation queue 70 is not empty, then processing returns to query task 301. When query task 304 determines presentation queue or FIFO 70 is empty, then processing passes to point B in FIG. 7.

A task 302 stores the time of arrival of the present digitized voice packet when query task 301 determines that a digitized voice packet has arrived. A query task 303 evaluates the present digitized voice packet to determine if a silence identifier (SID) also known as a voice pause indicator is present.

A query task 306 ascertains the present state of receiving node 10 to determine if the annunciation packets were generated from a received speech packet comprising normal voice, a prediction packet, or a speech packet comprising a speech pause indicator.

When query task 306 determines the previous annunciation data to have been generated from normal voice, the a task 323, in the preferred embodiment wherein a frame has 720 samples of annunciation data, adds or concatenates 720 samples of background noise of voice pause into the presentation queue.

When query task 306 determines the previous annunciation data to have been generated from a prediction packet, the a task 322 clears the pending prediction samples from the presentation queue and replaces the prediction samples with, in the preferred embodiment, 720 samples of background noise of voice pause data to presentation queue 70.

When query task 306 determines the previous annunciation data to have been generated from a voice pause indicator, then a task 324 concatenates or adds 720 samples of background noise or annunciation packets to the presentation queue. Processing then returns back to start. Following either task 322, or 323, a task 325 notes the present state of receiving a speech pause. Processing following 324, and 325 returns to start 317.

A task 307 produces 720 samples of synthesized voice data from the present packet when query task 303 determines that the present packet does not contain a voice pause indicator. Processing then passes to point A of FIG. 8.

Figure 7:
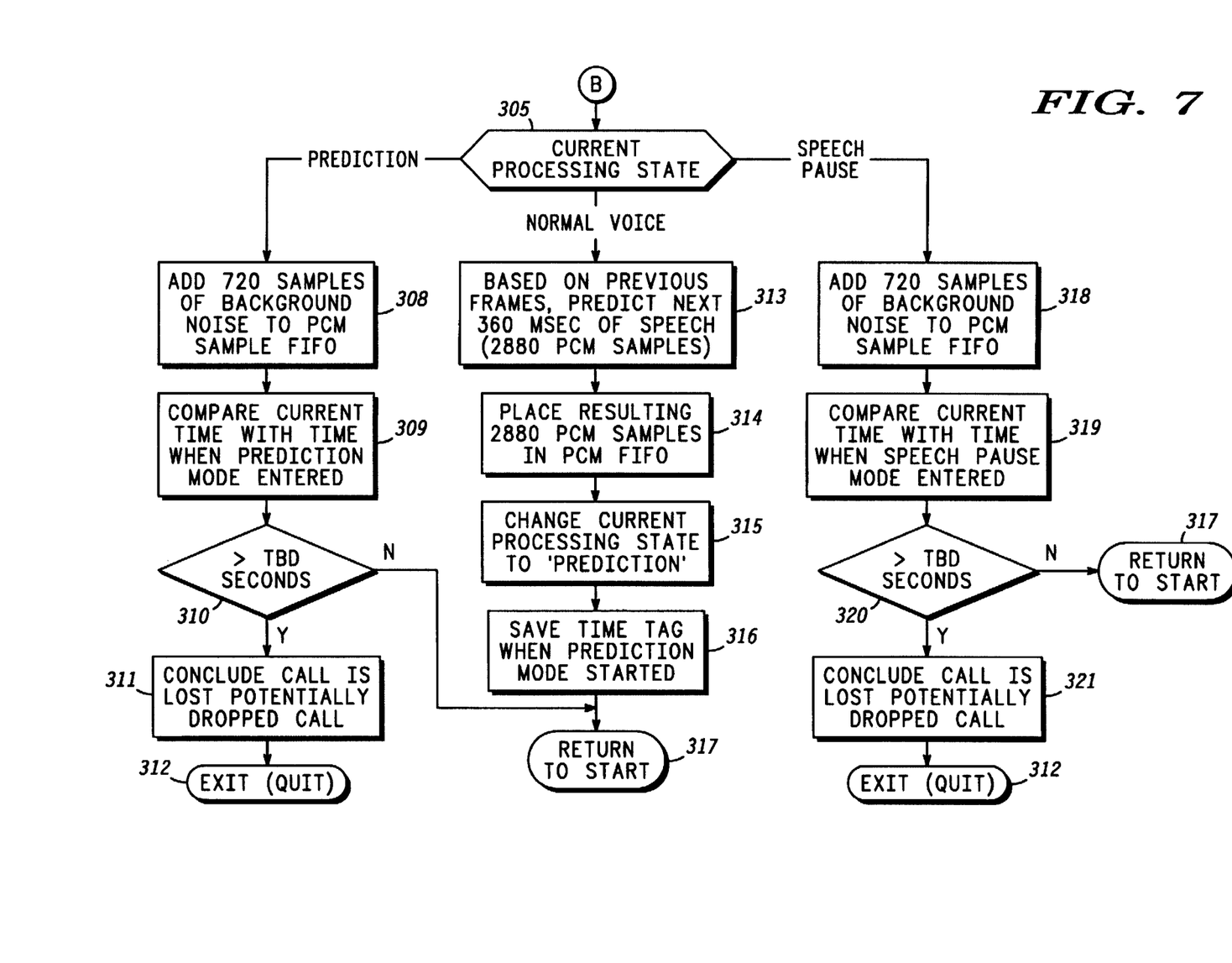

Now referring to FIG. 7, processing passed to point B as a result of the presentation queue or FIFO being empty and the absence of a present packet. A query task 305 determines the previous processing state in order to insert the proper packet data into the presentation queue.

A task 308 adds 720 samples of voice pause or background noise to the presentation queue when query task 305 discerns that the most recent annunciation data was a prediction packet. A task 309 compares the current time with the time when predictions packets began to be successively generated. A query task 310 compares a duration for successive prediction packet generation and when the duration has exceeded a dropped call threshold, typically on the order of a few seconds, then a task 311 notifies other support processes or a user that the call appears to have been dropped. Processing is then suspended by termination a task 312. If query task 310 determines that the dropped call threshold has not been exceeded, then processing returns to start.

A task 313 generates 2880 samples of predicted speech when query task 305 discerns that the most recent annunciation data was a packet of normal speech. Task 313 employs the values of the previous normal voice packets in predicting the four frames of predicted synthesized voice data. A task 314 adds the generated predicted packets to the presentation queue and a task 315 changes the current processing state or mode to "prediction." A task 316 records a time when the prediction mode was initiated and processing returns to start.

A task 318 adds 720 samples of background of voice pause samples to the presentation queue when query task 305 discerns that the most recent annunciation data was voice pause data. A task 319 compares the current time with the time when speech pause mode was entered. A query task 320 compares a duration for successive voice pause packet generation and when the duration has exceeded a dropped call threshold, typically on the order of a few seconds, then a task 321 notifies other support processes or a user that the call appears to have been dropped. Processing is then suspended by termination a task 312. If query task 320 determines that the dropped call threshold has not been exceeded, then processing returns to start.

Figure 8:
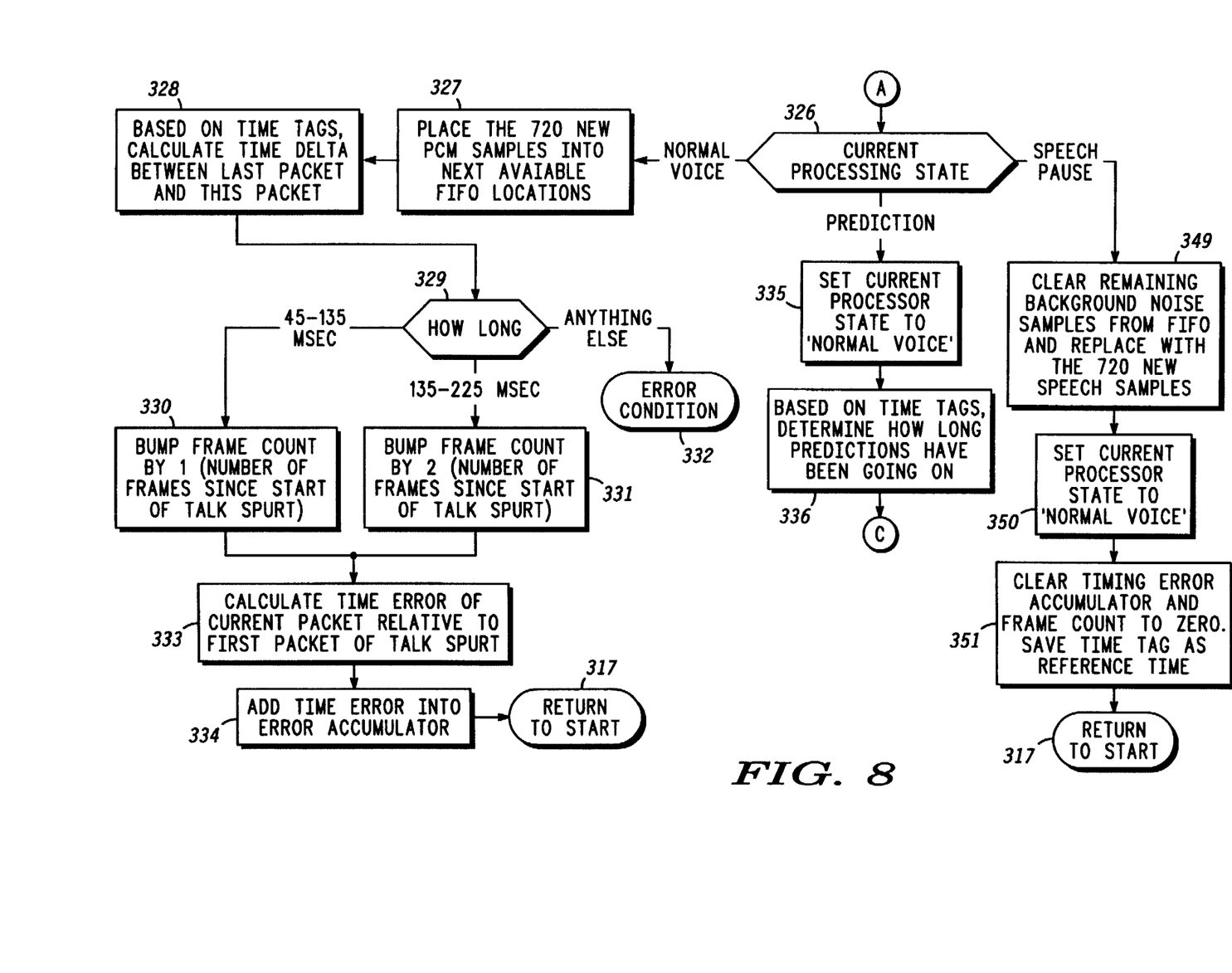

Now referring to FIG. 8, point A was entered from having received normal speech in a digitized voice packet and from having converted this packet into synthesized voice data. A query task 326 determines the processing state of the previous annunciation packets. When the previous processing state was presenting normal voice data, a task 327 concatenates the synthesized voice data into the presentation queue or FIFO for presentation.

A task 328 calculates a time of arrival delta based upon the actual arrival time of the present packet and the previous packet. A query task 329 compares this time of arrival delta against defined ranges. When the time of arrival delta is plus or minus one-half of a frame duration, 90 msec in the preferred embodiment, then a task 330 increments a frame counter by 1 frame count. When the time of arrival delta is delayed by two frame durations with a plus or minus one-half frame variation, then a task 331 increments the frame counter by 2 frame counts. A task 332 exhibits an error condition when the time of arrival delta falls outside these bounds. The frame counter is used as the denominator in calculating average time variations throughout a talk spurt.

A task 333 calculates a time error of the present packet relative to the first packet of the talk spurt. A task 334 adds the time error into the time error accumulator. Processing then returns to start.

When query task 326 determines the present processing state to be annunciating a speech pause, then a task 349 clears the remaining background or pause noise samples from the presentation queue and inserts, in the preferred embodiment, the 720 samples of synthesized voice data. A task 350 then sets the current processing state to 'normal voice.' A task 351 then clears the time error accumulator and the frame count is set to zero and the reference time is redefined as the arrival time of the present packet. This has the effect of resetting speech processor timing based on the first speech packet following a speech pause. Processing then returns to start.

When query task 326 determines that the present processing state is in prediction mode, then a task 335 changes the present mode to 'normal voice' to reflect the arrival of valid normal voice data. A task 336 determines how long the predictions have been ongoing and processing passes to point C in FIG. 9.

Figure 9:
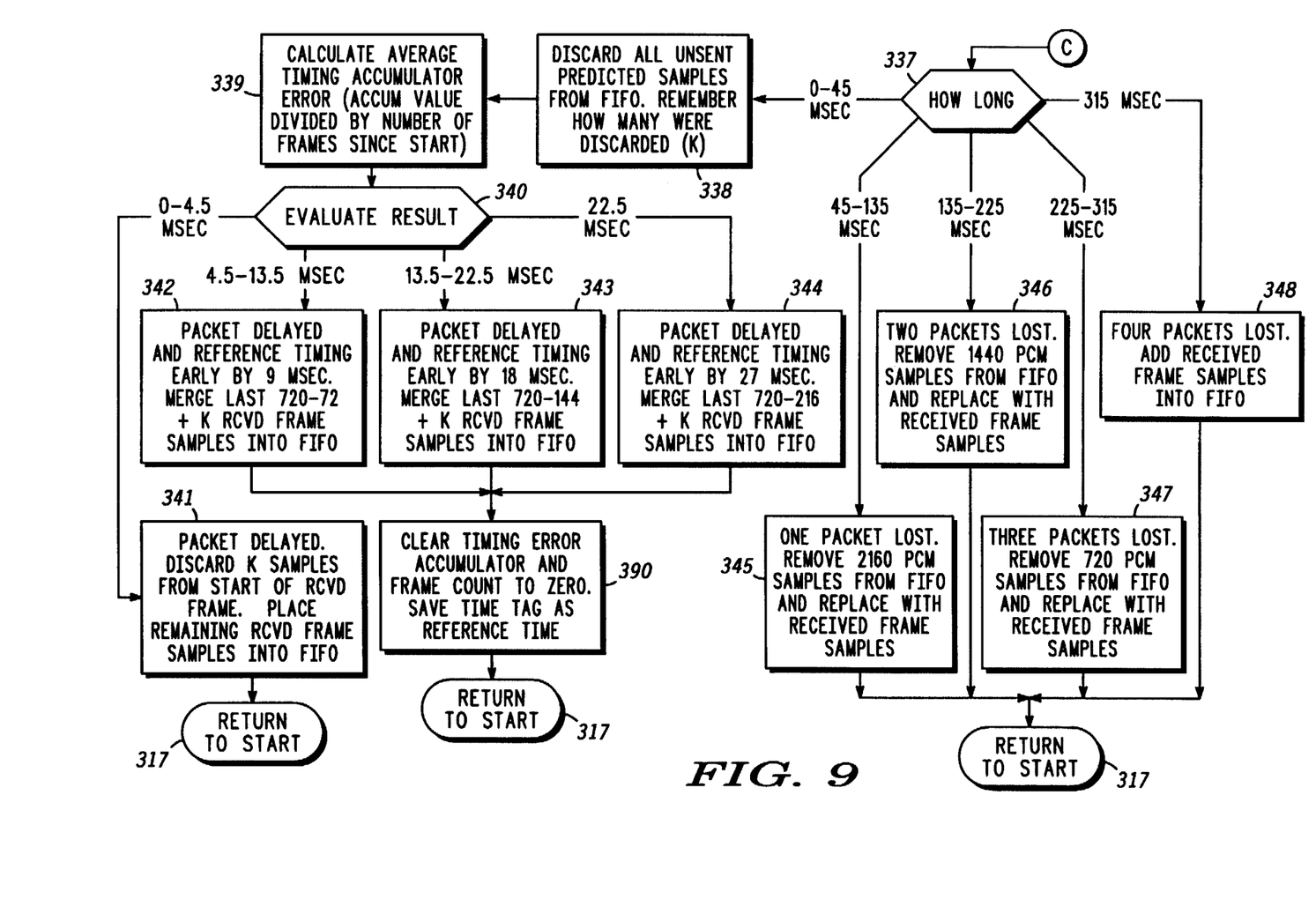

Now referring to FIG. 9, a query task 337 determines how long prediction has been ongoing and compares this prediction duration against defined ranges. When the prediction duration, in the preferred embodiment, has a prediction duration of 0 to ½ a frame duration, a task 338 counts and discards all (K) unannunciated samples from the presentation queue. Such a short prediction duration is indicative of a slightly delayed packet in the network. A task 339 calculates an average error in the time error accumulator by taking the accumulator value and dividing it by the frame count since the beginning of the talk spurt.

A query task 340 evaluates average time error and compares it against defined ranges. When the average time error, in the preferred embodiment, is less than 4.5 msec, then a task 341 detects this as a delayed packet and replaces the K deleted predicted samples with K of the 720 samples of the synthesized voice data. Processing then returns to start. In this case, there has been no adjustment to the timing associated with future frames. When the average time error is between 4.5–13.5 msec, then a task 342 detects this as a delayed packet with the reference timing being early as described in FIG. 4 receive node reference time line 573. Task 342 also replaces the K deleted predicted samples with 720–72+K samples into the presentation queue. This has the effect of moving the reference timing 9 msec later for all subsequent frames. When the average time error is between 13.5–22.5 msec, then a task 343 detects this as a delayed packet with the reference timing being early by 18 msec. Task 343 also replaces the K deleted predicted samples with 720–144+K samples into the presentation queue. This has the effect of moving the reference timing 18 msec forward for all subsequent frames. When the average time error exceeds 22.5 msec, then a task 344 detects this as a delayed packet with the reference timing being early by 27 msec and replaces the K deleted predicted samples with 720–216+K samples and places them in the presentation queue. This has the effect of moving the reference timing 27 msec forward for all subsequent frames. Following tasks 342–344, a task 390 clears the time error accumulator and frame counter to zero and stores the arrival time of the present packet as the reference arrival time. Processing then returns to start.

When query task 337 determines the prediction duration, in the preferred embodiment, to be between 45–135 msec, a task 345 detects this as the loss in sequencing of one packet and removes, in the preferred embodiment, 2160 samples of prediction data from the presentation queue and replaces the deleted samples with the 720 samples of the present synthesized voice data. Processing then returns to start.

When query task 337 determines the prediction duration to be between 135–225 msec, a task 346 detects this as the loss in sequencing of two packets and removes 1440 samples of prediction data from the presentation queue and replaces the deleted samples with the 720 samples of the present synthesized voice data. Processing then returns to start.

When query task 337 determines the prediction duration to be between 225–315 msec, a task 347 detects this as the loss in sequencing of three packets and removes 720 samples of prediction data from the presentation queue and replaces the deleted samples with the 720 samples of the present synthesized voice data. Processing then returns to start.

When query task 337 determines the prediction duration to be greater than 315 msec, a task 348 detects this as the loss in sequencing of four packets and adds the 720 samples of the present synthesized voice data. Processing then returns to start.

In summary, the present invention provides a method and system for minimizing voice delay caused by time jitter in a received packet stream. This invention also handles missing frames or packets, large time jumps potentially occurring when routing configurations change in a dynamic network during a call, and slowly varying timing changes due to the inherent dynamics network nodes, such as in the case of orbiting satellite relays. The present invention also compensates for timing discrepancies between successive frames timed off of an atypical reference frame, such as when the reference frame arrives early or late and produces speech gaps in subsequent frames. This re-framing is accomplished by discarding any of the background noise samples remaining in the presentation queue upon receipt of a non-silent speech frame. This has the effect of adjusting the timing, shortening or extending the speech pauses, as necessary.

The present invention has been described above with reference to a preferred embodiment. However, those skilled in the art will recognize that changes and modifications may be made in this preferred embodiment without departing from the scope of the present invention.

What is claimed is:

1. A method of compensating propagation time variations and substituting for lost packets while minimizing end-to-end delay in a packetized voice communication system wherein during an active call, a plurality of voice packets are transmitted from a transmitting node of said packetized voice communication system to a receiving node, said receiving node having a presentation queue for storing and annunciating annunciation packets, each of said plurality of voice packets being one of a type of said annunciation packets, said method comprising the steps of:

firstly receiving a reference voice packet at a reference arrival time, said reference voice packet being one of said plurality of voice packets;

queuing said reference voice packet in said presentation queue;

determining if said receiving node subsequently received a present voice packet, said present voice packet being a subsequent one of said plurality of voice packets;

when said receiving node received said present voice packet and said present voice packet comprises a voice pause indicator, concatenating a voice pause packet, based on the type of an immediately previous one of said annunciation packets, into said presentation queue at an adjusted position in said presentation queue;

when said receiving node received said present voice packet and said present voice packet comprises normal speech, concatenating said present voice packet, based on the type of an immediately previous one of said annunciation packets, into said presentation queue at an adjusted position in said presentation queue;

when said receiving node did not receive said present voice packet, determining if said presentation queue is empty;

when said presentation queue is empty, generating one of said annunciation packets based on the type of an immediately previous one of said annunciation packets and concatenating said one of said annunciation packets into said presentation queue; and returning to said determining if said receiving node subsequently received a present voice packet step during said active call.

2. A method as recited in claim 1, wherein the adjusted position is determined by a difference between said reference arrival time plus an expected packet period and an actual arrival time of said present voice packet.

3. A method as recited in claim 2, wherein said generating one of said annunciation packets step, comprises the steps of:

when said type of said immediately previous one of said annunciation packets is a prediction packet, generating said voice pause packet at one of said annunciation packets and terminating said active call when a prediction timeout occurs, said prediction timeout being a limitation on a quantity of successive ones of said prediction packet annunciated by said packetized voice communication system;

when said type of said immediately previous one of said annunciation packets comprises said normal speech, generating a prediction packet as said one of said annunciation packets; and when said type of said immediately previous one of said annunciation packets comprises said voice pause packet, generating a subsequent one of said voice pause packet as one of said annunciation packets and terminating said active call when a voice pause timeout occurs, said voice pause timeout being a limitation on the quantity of a successive one of said voice pause packet annunciated by said packetized voice communication system.

4. A method as recited in claim 2, wherein said when said receiving node received said present voice packet and said present voice packet comprises a voice pause indicator comprising step comprises the steps of:

when said type of said immediately previous one of said annunciation packets is said normal speech, concatenating a voice pause packet into said presentation queue;

when said type of said immediately previous one of said annunciation packets is a prediction packet, splicing a voice pause packet into said presentation queue by replacing a portion of said immediately previous one of said annunciation packets to be annunciated with a corresponding portion of said voice pause packet; and when said type of said immediately previous one of said annunciation packets is said voice pause packet, concatenating said voice pause packet into said presentation queue.

5. A method as recited in claim 2, wherein said when said receiving node received said present voice packet and said present voice packet comprises normal speech concatenating step comprises the steps of:

when said type of said immediately previous one of said annunciation packets is said normal speech, concatenating said present voice packet into said presentation queue;

when said type of said immediately previous one of said annunciation packets is a prediction packet, splicing a voice pause packet into said presentation queue by replacing a portion of said immediately previous one of said annunciation packets to be annunciated with a corresponding portion of said present voice packet; and when said type of said immediately previous one of said annunciation packets is said voice pause packet, replacing a portion of said immediately previous one of said annunciation packets to be annunciated with an entire one of said normal speech, and redefining said reference arrival time as said actual arrival time of said present voice packet.

6. A method as recited in claim 5, wherein said when said type of said immediately previous one of said annunciation packets is said normal speech concatenating step further comprises the steps of:

calculating a time error of said present voice packet said time error being an average departure from previous ones of said plurality of voice packets with said reference arrival time plus said expected packet period; and storing said time error.

7. A method as recited in claim 5, wherein said when said type of said immediately previous one of said annunciation packets is said prediction packet splicing step comprises the steps of:

determining a prediction duration denoting a quantity of successive ones of said prediction packet;

offsetting said voice pause packet proportional to a time error;

splicing said voice pause packet, as altered in said offsetting step, into said presentation queue by replacing a portion of said immediately previous one of said annunciation packets to be annunciated; and clearing said time error, said time error being an average departure from previous ones of said plurality of voice packets with said reference arrival time plus said expected packet period.

8. A method as recited in claim 5, wherein said when said type of said immediately previous one of said annunciation packets is said voice pause packet replacing step further comprises the step of:

clearing a time error, said time error being an average departure from previous ones of said plurality of voice packets with said reference arrival time plus said expected packet period.

9. A method of compensating propagation time variations in a packetized voice communication system having a transmitting node for transmitting a plurality of voice packets and a receiving node for receiving said plurality of voice packets, said method comprising the steps of:

firstly receiving a first one of said plurality of voice packets, said first one having a first arrival time;

queuing said first one of said plurality of voice packets for presentation;

commencing presentation of said first one of said plurality of voice packets;

attempting to receive a second one of said plurality of voice packets having a second arrival time;

when said attempting step is successful prior to said first arrival time plus an expected packet period, concatenating said second one of said plurality of voice packets to said first one of said plurality of voice packets and repeating said attempting step;

when said attempting step is unsuccessful prior to said first arrival time plus an expected packet period, predicting a prediction voice packet from data of said first one of said plurality of voice packets, concatenating said prediction voice packet to said first one of said plurality of voice packets and repeating said attempting step; and when said attempting step is successful following said first arrival time plus an expected second packet period, splicing said second one of said plurality of voice packets into said prediction voice packet and repeating said attempting step.

10. A method as recited in claim 9, wherein following said, concatenating said prediction voice packet to said first one of said plurality of voice packets and repeating said attempting step, said method further comprises the steps of:

secondly attempting to receive a third one of said plurality of voice packets having a third arrival time; and when said when said secondly attempting step is successful, determining a time error for said third one of said plurality of voice packets, said time error being a difference between said first arrival time and an expected third arrival time, commensurate with said time error, splicing said third one of said plurality of voice packets to said prediction voice packet, redefining said first arrival time to correspond to said third arrival time and repeating said attempting step.

11. A receiving node in a packetized voice communication system for use in compensating propagation time variations and substituting for lost packets wherein during an active call, a plurality of voice packets are transmitted from a transmitting node of said packetized voice communication system to said receiving node, said receiving node comprising:

a receiver for firstly receiving a reference voice packet at a reference arrival time, said reference voice packet being one of said plurality of voice packets and for receiving a present voice packet, said present voice packet being a subsequent one of said plurality of voice packets;

a timer for measuring a reference arrival time of said reference voice packet;

a presentation queue for receiving annunciation packets, said annunciation packets being said reference voice packet, and said present voice packet;

a processor coupled to said receiver, said timer, and said presentation queue, said processor for receiving from said receiver said reference voice packet and for determining if said receiver subsequently received said present voice packet and when said receiving node received said present voice packet and said present voice packet comprises a voice pause indicator, concatenating a voice pause packet, based on the type of an immediately previous one of said annunciation packets, into said presentation queue at an adjusted position in said presentation queue, when said receiving node received said present voice packet and said present voice packet comprises normal speech, concatenating said present voice packet, based on the type of an immediately previous one of said annunciation packets, into said presentation queue at an adjusted position in said presentation queue, when said receiving node did not receive said present voice packet, determining if said presentation queue is empty;

when said presentation queue is empty, generating one of said annunciation packets based on the type of an immediately previous one of said annunciation packets and concatenating one of said annunciation packets into said presentation queue, and returning to said determining if said receiving node subsequently received a present voice packet step during said active call; and an annunciator coupled to said presentation queue for presenting said annunciation packets to a user of said receiving node.

12. A receiving node as recited in claim 11 wherein said receiving node further comprises a time error accumulator coupled to said processor for maintaining a difference between said reference arrival time plus an expected packet period and an actual arrival time of said present voice packet as timed by said timer.

13. A receiving node as recited in claim 12 wherein said processor further comprises:

a means for generating one of said annunciation packets and when said type of said immediately previous one of said annunciation packets is a prediction packet, generating said voice pause packet as one of said annunciation packets and terminating said active call when a prediction timeout occurs, said prediction timeout being a limitation on a quantity of successive ones of said prediction packet annunciated by said packetized voice communication system;

when said type of said immediately previous one of said annunciation packets comprises said normal speech, generating a prediction packet as one of said annunciation packets; and when said type of said immediately previous one of said annunciation packets comprises said voice pause packet, generating a subsequent one of said voice pause packet as one of said annunciation packets and terminating said active call when a voice pause timeout occurs, said voice pause timeout being a imitation on a quantity of successive ones of said voice pause packet annunciated by said packetized voice communication system.

14. A receiving node as recited in claim 12 wherein said processor further comprises:

a means for when said receiver received said present voice packet and said present voice packet comprises a voice pause indicator and when said type of said immediately previous one of said annunciation packets is said normal speech, concatenating a voice pause packet into said presentation queue;

when said type of said immediately previous one of said annunciation packets is one of said prediction packet, splicing a voice pause packet into said presentation queue by replacing a portion of said immediately previous one of said annunciation packets to be annunciated with a corresponding portion of said voice pause packet; and when said type of said immediately previous one of said annunciation packets is said voice pause packet, concatenating a voice pause packet into said presentation queue.

15. A receiving node as recited in claim 12 wherein said processor further comprises:

a means for when said receiver receives said present voice packet and said present voice packet comprises normal speech and when said type of said immediately previous one of said annunciation packets is said normal speech, concatenating said present voice packet into said presentation queue;

when said type of said immediately previous one of said annunciation packets is a prediction packet, splicing a voice pause packet into said presentation queue by replacing a portion of said immediately previous one of said annunciation packets to be annunciated with a corresponding portion of said voice pause packet; and when said type of said immediately previous one of said annunciation packets is said voice pause packet, replacing a portion of said immediately previous one of said annunciation packets to be annunciated with an entire one of said present voice packet, and redefining said reference arrival time as said actual arrival time of said present voice packet.

16. A receiving node as recited in claim 15 wherein said processor further comprises:

a means for when said type of said immediately previous one of said annunciation packets is said normal speech concatenating and calculating a time error of said present voice packet, said time error being an average departure from previous ones of said plurality of voice packets with said reference arrival time plus said expected packet period; and a means for storing said time error in said time error accumulator.

17. A receiving node as recited in claim 15 wherein when said type of said immediately previous one of said annunciation packets is said prediction packet said processor further comprises:

a means for determining a prediction duration denoting a quantity of successive ones of said prediction packet;

a means for offsetting said voice pause packet proportional to a time error;

a means for splicing said voice pause packet, as altered in an offsetting step, into said presentation queue by replacing a portion of said immediately previous one of said annunciation packets to be annunciated; and a means for clearing said time error, said time error being an average departure from previous ones of said plurality of voice packets with said reference arrival time plus said expected packet period.

18. A receiving node as recited in claim 15 wherein when said type of said immediately previous one of said annunciation packets is said voice pause packet said processor further comprises:

a means for clearing a time error, said time error being an average departure from previous ones of said plurality of voice packets with said reference arrival time plus said expected packet period.

* * * * *

UNITED STATES PATENT AND TRADEMARK OFFICE
CERTIFICATE OF CORRECTION

PATENT NO. : 5,615,214
DATED : March 25, 1997
INVENTOR(S) : Ronald V. CHANDOS et al.

It is certified that error appears in the above-indentified patent and that said Letters Patent is hereby corrected as shown below:

Column 13, claim 13, line 6, change "imitation" to --limitation--.

Signed and Sealed this

Twenty-third Day of September, 1997

*Attest:*

BRUCE LEHMAN

*Attesting Officer*   *Commissioner of Patents and Trademarks*